United States Patent [19]
Girard et al.

[11] Patent Number: 6,054,782
[45] Date of Patent: *Apr. 25, 2000

[54] PULSE OR TIME ACTIVATED CONTROL DEVICE HAVING A REMOTE SWITCH

[75] Inventors: François Girard; Jean-Paul Gauthier, both of Dijon; Jean-Claude Metral, Saint Bernard; Pascal Malet; Michaël Pontiggia, both of Dijon, all of France

[73] Assignee: Societe A D E E, Pont de Pany, France

[*] Notice: This patent issued on a continued prosecution application filed under 37 CFR 1.53(d), and is subject to the twenty year patent term provisions of 35 U.S.C. 154(a)(2).

[21] Appl. No.: 08/950,077

[22] Filed: Oct. 14, 1997

[30] Foreign Application Priority Data

Oct. 15, 1996 [FR] France ................................. 96 12566

[51] Int. Cl.⁷ ..................................................... H01H 47/00
[52] U.S. Cl. .......................... 307/125; 307/139; 364/141
[58] Field of Search ............................... 307/38, 39, 139, 307/140, 141.4, 125; 377/2, 15, 16, 130; 364/140.01, 141, 142, 143

[56] References Cited

U.S. PATENT DOCUMENTS

| | | | |
|---|---|---|---|
| 4,068,179 | 1/1978 | Sample et al. ............................. | 328/72 |
| 4,180,803 | 12/1979 | Wesemeyer et al. ..................... | 340/164 |
| 4,202,038 | 5/1980 | Peterson ................................... | 364/709 |
| 4,245,296 | 1/1981 | Small et al. ........................ | 307/141.4 |
| 4,245,309 | 1/1981 | Kiefer ..................................... | 364/400 |
| 4,365,289 | 12/1982 | Small et al. ........................ | 307/141.4 |
| 4,465,956 | 8/1984 | Fowler .................................... | 318/268 |
| 4,625,205 | 11/1986 | Relis .................................. | 340/825.66 |
| 4,788,527 | 11/1988 | Johansson ............................... | 340/310 |
| 4,889,999 | 12/1989 | Rowen ...................................... | 307/31 |
| 5,583,382 | 12/1996 | Wagner .................................. | 307/10.1 |
| 5,753,983 | 5/1998 | Dickie et al. ....................... | 307/141.4 |

FOREIGN PATENT DOCUMENTS 39 20 595   1/1991   Germany .

*Primary Examiner*—Jeffrey Gaffin
*Assistant Examiner*—Peter Zura
*Attorney, Agent, or Firm*—Young & Thompson

[57] ABSTRACT

A control device employing a remote switch, intended to ensure activation and de-activation of electrical devices in accordance with a plurality of pre-established control functions, from different control members. Each of the control members is constituted by a single electrical contactor adapted to produce, when acted on by the user, a train of electric pulses. The control device includes elements for counting the number of electric pulses produced. The number of pulses counted controls the electric devices depending on the control function which is associated with this number of pulses.

8 Claims, 1 Drawing Sheet

PULSE OR TIME ACTIVATED CONTROL DEVICE HAVING A REMOTE SWITCH

FIELD OF THE INVENTION

The present invention relates to a device for controlling electrical appliances by a remote switch of programmable type.

BACKGROUND OF THE INVENTION

Remote switches are known to be constituted by casing boxes, modular or not, which, via a secondary electric circuit, make it possible to control from several locations a power contact for switching electrical equipment on or off. Certain remote switches sometimes include devices which perform complementary functions. Such is the case for time-switches which enable these remote switches to perform a function of time-delay In appliances of this type, it will be noted that the selection of different functions is ensured from the remote switch apparatus itself and not from one of the multiple members which control it. This results in a noteworthy complication for the user, since, in order to select the desired function, he is obliged to access the remote switch itself, which, apart from the fact that such access is not always possible, represents a difficulty, especially in large buildings where the remote switches may be very distant from the different control members.

Modular remote switches are also known, which make it possible, for example by means of a shift register, to control the successive implementation, in a pre-established order, of a plurality of functions associated with various electrical equipment by actuating any one of the control members. A remote switch system of this type is disclosed in U.S. Pat. No. 4,465,956. The use of such devices is particularly restricting, insofar as the user who wishes to control implementation of a given function, must previously control activation of all the other intermediate functions provided, and reactivate them again in the other sense if he then wishes to return to the initial position.

It is an object of the present invention to propose a remote-switch control device which makes it possible, from any one of its control members, to directly select and activate, or de-activate, a specific determined function of the remote switch.

SUMMARY OF THE INVENTION

To that end, the present invention relates to a control device employing a remote switch, intended to ensure activation and de-activation of electrical devices in accordance with a plurality of pre-established control functions, from different control members, characterized in that:

each of the control members is constituted by a single electrical contactor adapted to produce, when acted on by the user, a train of electric pulses, it comprises means for counting the number of said electric pulses produced, said counting means are in relation with selection and switching means adapted, as a fiction of the number of pulses counted, directly to connect the electric devices depending on the control function which is associated with this number of pulses.

In one embodiment of the invention, the control device comprises means adapted to produce a number of pulses which is a function of the time during which the user is acting on the control member. In a variant of the invention, the pulse producing means comprise a pulse generator employing the reversals of polarity of the electric network.

In another embodiment of the invention, the counting means are such that the number of pulses produced depends on the number of times that the user acts on the control member.

In an embodiment of the invention, the control members comprise a signalling device associated therewith, which is in connection with said selection means, particularly by a bus, in order to display a signal designating the control function selected. The connection means may also be constituted in particular by a carrier current device.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
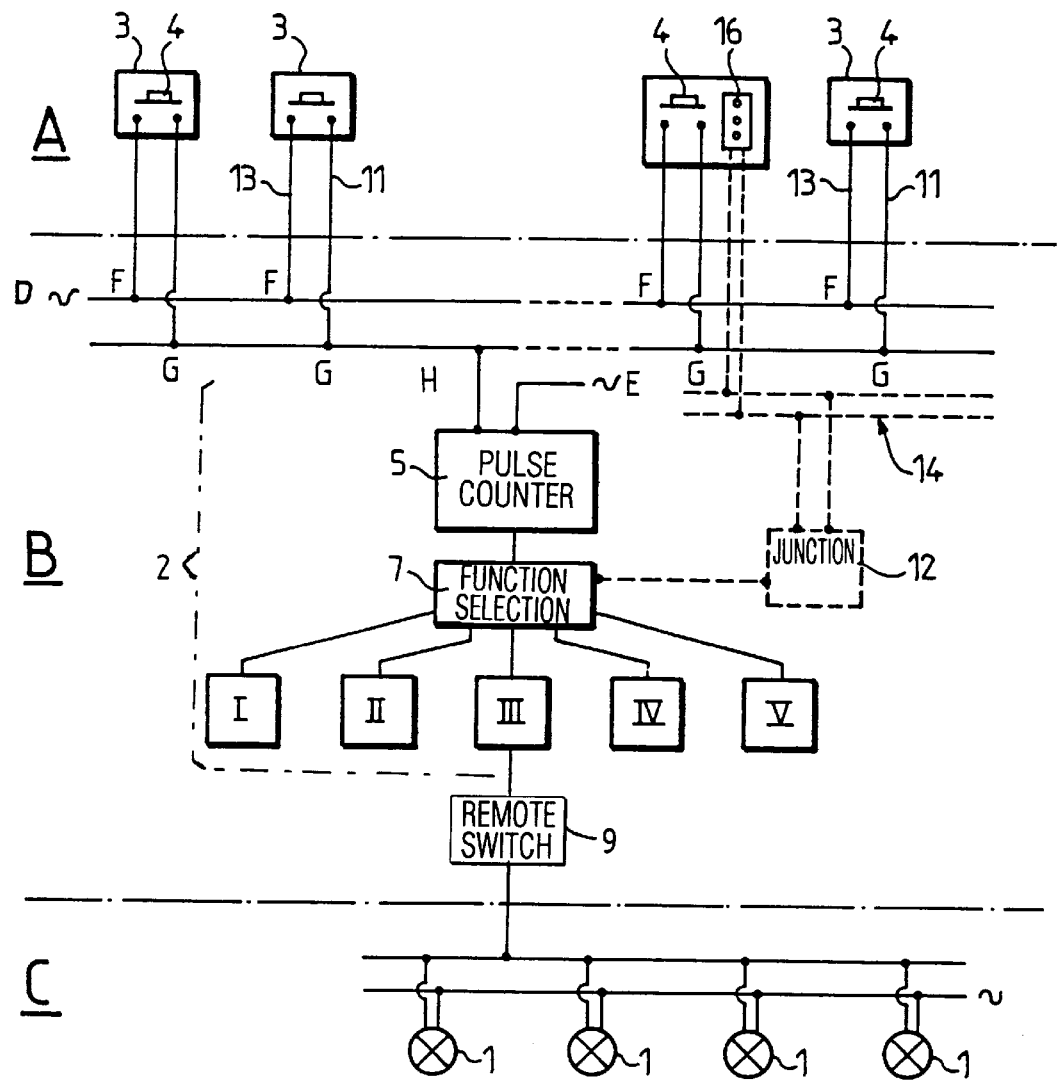
FIG. 1 is a schematic block diagram of an example of embodiment of the invention.

Referring now to the drawings, FIG. 1 shows an installation employing a device according to the invention for controlling by a remote switch. This installation is distributed over three zones which may be distant from one another, namely a zone A (for example a staircase and a basement) where contactors 3 are located, a zone B ( such as for example a control room containing a control panel) and a zone C (for example a garage) where lamps 1 are disposed.

The contactors 3 are conventional push button type contactors which, when their control button 4 is pushed in, close the electric circuit between their terminals F and G. One of the terminals, terminal F in the drawings, of each contactor 3 is connected to one of the wires D supplying electrical current and the other terminal G is connected to an input H of a remote switch control circuit 2.

The latter is constituted by a pulse counting circuit 5 that may receive a clock input E, a function selecting circuit 7 and a remote switch 9. When one of the contactors 3 is activated for a given time t, there are sent to the counting circuit 5 a number n of pulses at the frequency N of the electric network (50 Hz), viz. 50 pulses per second.

Figure 2A:
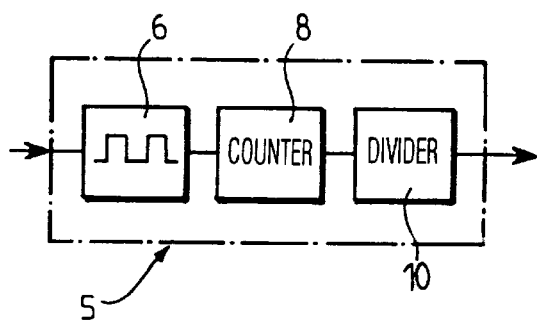
FIGS. 2a and 2b are variant embodiments of the invention.
Figure 2B:
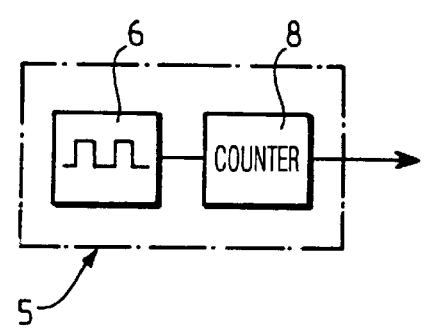

As shown in FIG. 2a, the counting circuit 5 comprises a signal-shaping circuit 6 which transforms the sine wave of the electric network into a square signal, and a counter 8 which counts the number n of pulses emitted and determines, by a divider 10 associated therewith, the time t during which the user has maintained the control button 4 depressed. Of course, as shown in FIG. 2b, it is not indispensable to provide such a divider 10 and the device may also be designed to function from data constituted by the number n of pulses measured by the counter circuit 8.

The counting circuit 5 is connected to the function selection circuit 7, preferably a programmed switching system, which, as a function of the duration of actuation t (or of the number of pulses n measured by the counting circuit 5), is in a position to activate respectively one of the five electronic means for performing five specific control functions I, II, III, IV and V, respectively. These means are connected to the remote switch 9, which manages the electrical supply of the lamps 1.

The counting circuit 5 and the function selection circuit 7 may of course be made from discrete components or, preferably, from software means stored in programmable electronic means such as in particular micro-controllers.

A mode of programming the five functions I, II, III, IV and V will be described hereinafter by way of example, the significances thereof being given in detail in Table I hereinafter.

Under these conditions, operation of the device according to the invention is established as described hereinafter.

When the user pushes in any one of the control buttons 4, he activates the contactor 3 associated therewith, this simultaneously switching on the counting circuit 5. As soon as the user releases the control button 4, counting stops and the duration t of the activation is sent to the function selection circuit 7.

TABLE I

| time t measured or | number of pulses n | Function |
|---|---|---|
| 0 to 0.1 s | 0 to 5 | No action |
| 0.1 to 3 s | 5 to 150 | Function I: Simple remote switch |
| 3 s to 6 s | 150 to 300 | Function II: Activation tinier |
| 6 s to 12 s | 300 to 600 | Function III: Return to zero |
| 12 s to 25 s | 600 to 1250 | Function IV: Blockage tinier |
| more than 25 s | more than 1250 | Function V: Blockage remote switch |

Said circuit compares the time t (or the number of pulses n) with the table of functions summarized in Table I above and, as a function of the value measured, establishes the appropriate switching.

In order to eliminate both the mechanical rebounds of the contactors and the parasitic line signals, any action on the control button 4 of a contactor 3 lasting less than a threshold duration of, for example, 0.1s, will not trigger off any specific function.

If the duration t of the activation measured by the counting circuit 5 is included between 0.1s and 3s (or 5 to 150 pulses), the function selection circuit 7 engages a function of simple remote switch (function I), i.e. a conventional flip-flop type operation (or bistable switch), with the result that, by acting on a contactor 3, all the lamps 1 are placed in one position (for example lit up) and a new, subsequent, identical action on a contactor 3 places all the lamps 1 in the other position (for example extinguished).

If the duration t of the activation measured by the counting circuit 5 is included between 3s and 6s (or 150 to 300 pulses), the function selection circuit 7 engages a function of activation of timer (function II), i.e. it controls lighting of lamps 1 for a predetermined duration $T_1$, for example preprogrammed in the remote switch 9. During this state, action on any one of the contactors 3 for a time included between 0.1s and 3s will have for effect to interrupt the timer function and to extinguish the lamps 1. In a variant embodiment of the invention, when the duration $T_1$ allotted to timer function is close to its expiration, power reduction means are automatically activated in order to reduce, for example by half, the power delivered to the lamps 1 during the time remaining before duration $T_1$ expires, which is advantageous in that it indicates to the user the imminence of extinction thereof, so as to allow him, for example, to re-trigger the system for a new timing cycle.

If the duration t of the activation measured by the counting circuit 5 is included between 6s and 12s (or 300 to 600 pulses), the function selection circuit 7 engages a function of return to zero of all the remote switches 9 controlled (function III).

If the duration t of the activation measured by the counting circuit 5 is included between 12s and 25s (or 600 to 1250 pulses), the function selection circuit 7 engages a function of blockage of the timer (function IV), which enables the user to maintain lamps 1 lit when he wishes to carry out an operation of long duration. Such an embodiment is particularly advantageous in that it makes it possible to control blockage and unblockage of the timer from any one of the contactors 3, while, in the prior art devices, such a control can be effected only from the remote switch itself, which usually obliges the user to have access to the control panel of Zone B the installation which, for various reasons associated in particular with security, cannot always be envisaged.

When the user has finished such operation of long duration, he will have the possibility, from any one of the contactors 3, to return the system into its initial state, passing for example into timer activation function (function II) or simple remote switch function (function I).

If the duration t of the activation measured by the counter 5 is greater than 25s (or more than 1250 pulses), the function selection circuit 7 engages a function of blockage of the remote switch 9 (function V), in the position where it lies at the moment of activation. Unblocking can in that case be effected only by an intervention on the system.

If the parameter of measurement taken into account by the function selection circuit 7 can be the duration t of activation on the push button, it can also be the number n of the pulses which are generated during this activation as shown in Table I. This number of pulses may be the number n of the pulses obtained from the frequency of 50 Hertz of the electric network or, in the case of a rectified supply, a number of pulses N obtained by alternate manual action of the user on the contactor, as will be indicated hereinafter.

The control device according to the invention presents the advantage of being able to be positioned in an already existing installation without any modification of the wiring thereof. In fact, it is observed, as shown in FIG. 1, that the connection by "two wires" 11 and 13 between the contactors 3 and zone C is already in place in all the existing installations. The only modifications concern the elements of zone B, i.e. at the level of the control panel, which makes it possible to pass easily and without specific works, from a conventional installation to an installation according to the invention.

If desired, it is also possible to add to the contactors 3 means for displaying the function selected. FIG. 1 shows such a variant in broken lines. To that end, the function selection circuit 7 is connected to a junction 12 connected to a two-wire bus line 14 to which is connected display 16 which may be disposed in the casing boxes of the contactors 3. Such a variant embodiment obviously involves adding two additional wires to the existing installation.

The two wires existing in the installation might, of course, also be used for conveying carrier currents at different frequency, and in particular a higher frequency in order to control lighting of display 16 signalling the function selected.

As mentioned hereinabove, activation of the different functions may also be controlled, according to the invention, by a train of pulses of short duration generated directly by alternate manual action of the user on a contactor 3. In such an embodiment, the counting circuit 5 is of the type shown in FIG. 2b, so that the number of activations N effected by the user on a contactor 3 is measured for a determined maximum time, of the order of 6 seconds for example.

Table II hereinbelow shows the significance of the different functions which may thus be employed.

TABLE II

| Number of pulses N | Function |
| --- | --- |
| 1 | Function I: Simple remote switch |
| 2 | Function II: Activation tiiner |
| 3 | Function III: Return to zero |
| 4 | Function IV: Blockage timer |
| 5 | Function V: change of delay time of timer |
| more than 5 | Function VI: Blockage remote switch |

As shown in Table II, a function of change of delay time of the timer may in particular be added, which would enable the user to have several periods of operation thereof available.

The list given in Tables I and II of the different functions that may be selected is not exhaustive and other types of functions may be programmed without departing from the scope of the invention.

The phase of counting the pulses emitted may be preceded by an initialization signal which may advantageously be constituted by a pulse of greater duration.

Similarly, the end of counting of the pulses may be followed by an end signal which may be constituted by a longer pulse.

What is claimed is:

1. A combination of a control device and a control member for operating a remote switch that controls an electrical device connected to the remote switch in accordance with plural predetermined control functions;

said control member comprising a simple electrical contactor connected only to two electrical wires for producing a train of periodic electrical pulses when said control member is actuated by a user, a number of pulses in the train of electrical pulses being a function of a time period a user continuously actuates said contactor; and said control device comprising a counter connected to said control member through one of said two electrical wires and counting the number of electrical pulses in the train of electrical pulses from said control member, and a function selector connected to said counter and arranged and constructed for connection to the remote switch that controls the electrical device, said function selector directly selecting one of the plural control functions based on the time period said contactor is continuously actuated as indicated by the number of counted pulses and providing the selected function to the remote switch for application to the electrical device, wherein said function selector allows only one opportunity to select one of the plural control functions while said contactor is continuously actuated.

2. The combination of claim 1, wherein said control member further comprises a signaling device indicating the selected function.

3. The combination of claim 1, wherein said contactor produces a train of electrical pulses where a frequency of the pulses is related to a frequency of a power supply for said control member.

4. The combination of claim 1, wherein said simple electrical contactor comprises a push button switch that produces the train of pulses so long as said push button switch is depressed, the number of pulses in the train of pulses being a function of how long said push button switch is depressed.

5. An electrical system comprising:

an electrical device;

a remote switch connected to and controlling said electrical device;

a control member connected to said remote switch and controlling said remote switch in accordance with plural predetermined control functions, said control member comprising a simple electrical contactor connected only to two electrical wires and producing a train of periodic electrical pulses when said control member is actuated by a user, a number of pulses in the train of electrical pulses being a function of a time period a user continuously actuates said contactor; and a control device comprising a counter connected to said control member through one of said two electrical wires for counting the number of electrical pulses in the train of electrical pulses from said control member, and a function selector connected to said counter and connected to said remote switch, said function selector directly selecting one of the plural control functions based on the time period said contactor is continuously actuated as indicated by the number of counted pulses and providing the selected function to said remote switch for application to said electrical device, wherein said function selector allows only one opportunity to select one of the plural control functions while said contactor is continuously actuated.

6. The system of claim 5, wherein said control member further comprises a signaling device indicating the selected function.

7. The system of claim 5, wherein said contactor produces a train of electrical pulses where a frequency of the pulses is related to a frequency of a power supply for said control member.

8. The combination of claim 5, wherein said simple electrical contactor comprises a push button switch that produces the train of pulses so long as said push button switch is depressed, the number of pulses in the train of pulses being a function of how long said push button switch is depressed.

* * * * *